United States Patent
Kim et al.

(10) Patent No.: US 11,072,689 B2
(45) Date of Patent: Jul. 27, 2021

(54) GEL POLYMER ELECTROLYTE, ELECTROCHROMIC DEVICE COMPRISING THE SAME AND PRODUCTION METHOD THEREOF

(71) Applicant: LG CHEM, LTD., Seoul (KR)

(72) Inventors: Kyung Oh Kim, Daejeon (KR); Sa Rah Kim, Daejeon (KR); Ji Yeon Kim, Daejeon (KR); Sung Soo Yoon, Daejeon (KR); Su Hee Lee, Daejeon (KR); Su Jeong Kim, Daejeon (KR); Jeong Ae Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 204 days.

(21) Appl. No.: 16/335,168

(22) PCT Filed: Oct. 30, 2017

(86) PCT No.: PCT/KR2017/012037
§ 371 (c)(1),
(2) Date: Mar. 20, 2019

(87) PCT Pub. No.: WO2018/080246
PCT Pub. Date: May 3, 2018

(65) Prior Publication Data
US 2019/0276607 A1   Sep. 12, 2019

(30) Foreign Application Priority Data
Oct. 31, 2016 (KR) .................. 10-2016-0142874

(51) Int. Cl.
*C08G 81/02* (2006.01)
*G02F 1/15* (2019.01)
(Continued)

(52) U.S. Cl.
CPC .............. *C08G 81/025* (2013.01); *C08F 8/30* (2013.01); *C08F 220/18* (2013.01);
(Continued)

(58) Field of Classification Search
CPC .. F28D 15/0266; F28D 15/02; F28D 15/0275; H05K 7/20; H05K 7/20309;
(Continued)

(56) References Cited

U.S. PATENT DOCUMENTS 6,296,783 B1   10/2001   Shindo et al.
6,403,741 B1   6/2002   Heuer et al.
(Continued)

FOREIGN PATENT DOCUMENTS

CN   104861119 A   8/2015
CN   105593256 A   5/2016
(Continued)

OTHER PUBLICATIONS

International Search Report for PCT/KR2017/012037 (PCT/ISA/210) dated Sep. 14, 2018.
(Continued)

*Primary Examiner* — Tuyen Tra
(74) *Attorney, Agent, or Firm* — Birch, Stewart, Kolasch & Birch, LLP

(57) ABSTRACT

The present application relates to a gel polymer electrolyte, a method for producing a gel polymer electrolyte, and an electrochromic device comprising the same. As the gel polymer electrolyte comprises a block copolymer, the present application can simultaneously satisfy high ionic conductivity, low turbidity and adhesiveness.

11 Claims, 1 Drawing Sheet

| 10 |
| 11 |
| 12 |
| 20 |
| 32 |
| 31 |
| 30 |

(51) Int. Cl.
  *C08J 3/075*   (2006.01)
  *C09D 153/00*  (2006.01)
  *C08F 287/00*  (2006.01)
  *C08F 220/42*  (2006.01)
  *C08F 8/30*    (2006.01)
  *C08F 293/00*  (2006.01)
  *C08F 220/18*  (2006.01)
  *H01L 27/32*   (2006.01)
  *C08G 65/34*   (2006.01)

(52) U.S. Cl.
  CPC .......... *C08F 220/42* (2013.01); *C08F 287/00* (2013.01); *C08F 293/005* (2013.01); *C08G 65/34* (2013.01); *C08J 3/075* (2013.01); *C09D 153/005* (2013.01); *G02F 1/15* (2013.01); *H01L 27/32* (2013.01); *C08F 2438/01* (2013.01); *G02F 2001/164* (2019.01)

(58) Field of Classification Search
  CPC .......... H05K 7/20318; H05K 7/20327; H05K 7/20827; G06F 1/20; G06F 2200/201
  See application file for complete search history.

(56) References Cited

U.S. PATENT DOCUMENTS

| | | |
|---|---|---|
| 7,557,166 B2 | 7/2009 | Oyama et al. |
| 9,164,345 B2 | 10/2015 | Konkin et al. |
| 9,431,677 B2 | 8/2016 | Bouchet et al. |
| 10,308,751 B2 | 6/2019 | Yoon et al. |
| 10,361,456 B2 | 7/2019 | Moon et al. |
| 2011/0051218 A1 | 3/2011 | Georen et al. |
| 2016/0013515 A1 | 1/2016 | Lee et al. |
| 2016/0093916 A1 | 3/2016 | Moon et al. |
| 2016/0208039 A1 | 7/2016 | Yoon et al. |

FOREIGN PATENT DOCUMENTS

| | | |
|---|---|---|
| CN | 105470569 B | 8/2019 |
| JP | 6-199934 A | 7/1994 |
| JP | 2000-2896 A | 1/2000 |
| JP | 2009-102608 A | 5/2009 |
| JP | 2014-510944 A | 5/2014 |
| JP | 2014-529863 A | 11/2014 |
| KR | 10-1999-0088611 A | 12/1999 |
| KR | 10-0819025 A | 4/2008 |
| KR | 10-0843569 A | 7/2008 |
| KR | 10-2011-0003505 A | 1/2011 |
| KR | 10-2013-0013991 A | 2/2013 |
| KR | 10-2014-0037989 A | 3/2014 |
| KR | 10-2014-0074540 A | 6/2014 |
| KR | 10-2016-0008369 A | 1/2016 |
| KR | 10-2016-0037061 A | 4/2016 |
| TW | 461984 B | 11/2001 |
| WO | WO 2017/181294 A1 | 10/2017 |

OTHER PUBLICATIONS

English translation of JP-2009-102608-A.
English translation of KR-10-2013-0013991-A.
English translation of KR-10-2016-0008369-A.
English translation of KR-10-2016-0037061-A.
European Search Report for Appl. No. 17863402.8 dated Oct. 1, 2019.

[Figure 1]
| 10 |
|---|
| 11 |
| 12 |
| 20 |
| 32 |
| 31 |
| 30 |
[Figure 2]
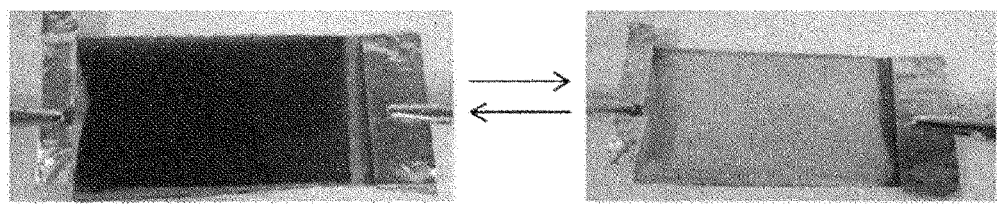
Coloring          Bleaching

GEL POLYMER ELECTROLYTE, ELECTROCHROMIC DEVICE COMPRISING THE SAME AND PRODUCTION METHOD THEREOF

TECHNICAL FIELD

The present application relates to a gel polymer electrolyte, a method for producing a gel polymer electrolyte, an electrochromic device comprising the same, and a production method thereof. The present application claims the benefit of priority based on Korean Patent Application No. 10-2016-0142874 filed on Oct. 31, 2016, the disclosure of which is incorporated herein by reference in its entirety.

BACKGROUND ART

Electrochromism refers to a phenomenon in which optical properties, such as color and light transmittance, of an electrochromic active material are changed by electrochemical oxidation and reduction reactions. The electrochromic device using such a phenomenon is attracting attention in various fields such as a smart window, a smart mirror, or an electronic paper because it can be manufactured as an element having a large area even at a small cost and has low power consumption. Such an electrochromic device is generally configured to comprise a substrate, a transparent electrode, an electrochromic layer, an electrolyte layer, and an ion storage layer.

On the other hand, the electrolyte layer comprises electrolyte ions involved in an electrochromic reaction of the device, while being inserted or removed between the electrochromic layer and the ion storage layer. Therefore, the electrolyte layer contributes greatly to cycle characteristics and durability of the electrochromic device.

In the case of a liquid electrolyte most widely used as a conventional electrolyte, there is a risk of electrolyte leakage, which may lower the durability of the device. Also, when the device is manufactured in a large area, the liquid electrolyte has a problem that the liquid electrolyte is driven to the bottom of the device by gravity. Furthermore, an inorganic solid electrolyte does not have such a problem of the liquid electrolyte, but it has problems of low ionic conductivity and poor adhesion. Accordingly, it is required to develop a polymer electrolyte which can be applied to an electrochromic device having more stable and high performances.

DISCLOSURE

Technical Problem

It is an object of the present application to solve a problem that in the case of the conventional gel polymer electrolyte applied to the electrochromic device, the electrolyte is difficult to form a film due to low solubility of components forming the gel or upon manufacturing the film, its turbidity is high due to compatibility problem with lithium ions to lower transparency.

It is another object of the present application to provide an electrochromic device comprising a gel polymer electrolyte exhibiting low turbidity and high ionic conductivity while having adhesiveness.

Technical Solution

The term "block copolymer" may mean a copolymer comprising blocks in which different monomers are polymerized (blocks of different polymerized monomers). The meaning that a particular block "comprises" a particular monomer or polymer may mean that the monomer or polymer is included as such, or polymerized, induced or derived from the particular monomer or polymer.

In this specification, the term 'and/or' is used as a meaning to include at least one or more of components listed before and after.

In this specification, the term alkyl group may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be a linear, branched or cyclic alkyl group and may be optionally substituted with one or more substituents.

In this specification, the term alkylene group may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be a linear, branched or cyclic alkylene group and may optionally be substituted with one or more substituents.

In this specification, the term aromatic hydrocarbon may mean an aryl group or arylene group, and may mean a monovalent or divalent residue derived from a compound comprising one benzene ring structure or a structure in which two or more benzene rings are linked while sharing one or two carbon atoms, or linked by any linker, or a derivative thereof, unless otherwise specified. The aryl group or arylene group may be an aryl group or arylene group having 6 to 30 carbon atoms, 6 to 25 carbon atoms, 6 to 21 carbon atoms, 6 to 18 carbon atoms or 6 to 13 carbon atoms, unless otherwise specified.

The present application relates to a gel polymer electrolyte, a method for producing a gel polymer electrolyte, and an electrochromic device comprising the same.

In one example related to the present application, the present application relates to a gel polymer electrolyte. The gel polymer electrolyte comprises a block copolymer which comprises a first block comprising a unit of Formula 1 below; and a second block comprising a unit containing an amino group, a hydroxy group or a polyalkylene oxide unit and a unit derived from polymerizing a monomer of Formula 2 below:

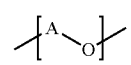
[Formula 1]

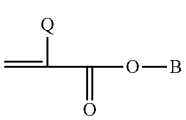
[Formula 2]

In Formula 1, A is an alkylene group having 1 to 8 carbon atoms, and in Formula 2, Q is hydrogen or an alkyl group having 1 to 20 carbon atoms and B is an alkyl group having 1 to 32 carbon atoms, an aromatic hydrocarbon having 6 to 32 carbon atoms or a carboxyl group.

The gel polymer electrolyte according to the present application may comprise the block copolymer, thereby satisfying simultaneously high ionic conductivity and low turbidity, and providing an electrolyte having adhesiveness with an electrochromic material layer.

The first block of the block copolymer may comprise a unit of Formula 1 as a main component. The fact that the unit of Formula 1 is included as a main component may mean that 55 wt % or more of the first block in the block copolymer comprises the unit of Formula 1, which may be 58 wt % or more, 62 wt % or more, or, for example, 65 wt % or more, but is not limited thereto. Also, the upper limit of the unit of Formula 1 in the first block is not particularly limited, and may be, for example, 100 wt % or less.

The alkyl group present in A in Formula 1 may have 1 to 8 carbon atoms, 1 to 6 carbon atoms, 1 to 4 carbon atoms or 1 to 2 carbon atoms, but is not limited thereto.

The second block of the block copolymer may comprise a unit comprising an amino group, a hydroxyl group or a polyalkylene oxide unit. In one example, the unit comprising an amino group, a hydroxyl group or a polyalkylene oxide unit may be a (meth)acrylate monomer containing an amino group, a hydroxyl group or a polyalkylene oxide unit. One or more of the (meth)acrylate monomers comprising an amino group, a hydroxyl group or a polyalkylene oxide unit may be included. The monomer may mean a polymerizable monomer other than alkyl (meth)acrylate comprising the above-described unit represented by Formula 2. The (meth)acrylate monomer comprising an amino group, a hydroxyl group or a polyalkylene oxide unit can increase the solubility of the block copolymer in a solvent for forming the electrolyte to lower the turbidity.

The (meth)acrylate monomer containing an amino group may be exemplified by, for example, 2-aminoethyl (meth)acrylate, 3-aminopropyl (meth)acrylate, N,N-dimethylaminoethyl (meth)acrylate, N,N-dimethylaminopropyl (meth)acrylate, and the like, but is not limited thereto.

The (meth)acrylate monomer comprising a hydroxyl group may be exemplified by, for example, ethylene glycol methyl ether acrylate, polyethylene (meth)acrylate, ethylene glycol phenyl ether acrylate, ethylene glycol dicyclopentenyl ether acrylate, and the like, but is not limited thereto.

The second block of the block copolymer may comprise a unit derived from polymerizing a monomer of Formula 2 as a main component. The fact that the unit of Formula 2 is included as a main component may mean that 55 wt % or more of the first block in the block copolymer comprises the unit of Formula 1, which may be 58 wt % or more, 62 wt % or more, or, for example, 65 wt % or more, but is not limited thereto. Also, the upper limit of the unit of Formula 1 in the first block is not particularly limited, and may be 99 wt % or less, 97 wt % or less, 95 wt % or less, 93 wt % or less, 91 wt % or less, 90 wt % or less, 88 wt % or less, 86 wt % or less, 84 wt % or less, 82 wt % or less, or for example, 80 wt % or less.

In Formula 2 above, the alkyl group present in Q may be an alkyl group having 1 to 20 carbon atoms, 1 to 16 carbon atoms, 1 to 12 carbon atoms, 1 to 8 carbon atoms or 1 to 4 carbon atoms. The alkyl group may be linear, branched or cyclic. In addition, the alkyl group may be optionally substituted with one or more substituents.

In Formula 2, B may be a linear or branched alkyl group having 1 or more carbon atoms, 3 or more carbon atoms, 5 or more carbon atoms, 7 or more carbon atoms, or 9 or more carbon atoms, which may be optionally in a substituted or unsubstituted state. The upper limit of carbon number in the linear or branched alkyl group is not particularly limited, and for example, the alkyl group may be an alkyl group having 32 or less carbon atoms or 30 or less carbon atoms.

In another example, B in Formula 2 may be an alicyclic hydrocarbon group, for example, an alicyclic hydrocarbon group having 3 to 20 carbon atoms, 3 to 16 carbon atoms or 6 to 12 carbon atoms, and an example of such a hydrocarbon group may be exemplified by an alicyclic alkyl group having 3 to 20 carbon atoms, 3 to 16 carbon atoms or 6 to 12 carbon atoms, such as a cyclohexyl group or an isobornyl group, and the like.

In another example, B in Formula 2 may be an aromatic substituent, for example, an aryl group or an arylalkyl group. Here, the aryl group may be, for example, an aryl group having 6 to 24 carbon atoms, 6 to 18 carbon atoms or 6 to 12 carbon atoms. Also, the alkyl group of the arylalkyl group may be, for example, an alkyl group having 1 to 20 carbon atoms, 1 to 16 carbon atoms, 1 to 12 carbon atoms, 1 to 8 carbon atoms or 1 to 4 carbon atoms. The aryl group or arylalkyl group may be exemplified by a phenyl group, a phenylethyl group, a phenylpropyl group or a naphthyl group, and the like, but is not limited thereto.

Here, the substituent which may be optionally substituted on the alkyl group, aryl group or hydrocarbon group, and the like of Formula 2 above may be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group, an alkyl group, an alkenyl group, an alkynyl group or an aryl group, and the like, but is not limited thereto.

In one example, the compound represented by Formula 1 may be any one selected from the group consisting of polyethylene oxide, polypropylene oxide and polyoxymethylene, or a mixture of two or more thereof, and may be, for example, polyethylene oxide having a number average molecular weight of 500 to 100,000, but is not limited thereto. In the present application, the term "number average molecular weight" may mean an analytical value measured by a magnetic resonance apparatus (NMR), and unless otherwise specified, the molecular weight of any polymer may mean the number average molecular weight of the polymer.

In one example, B in Formula 2 above may be alkyl having 1 to 32 carbon atoms, may be alkyl having 1 to 30 carbon atoms, 1 to 28 carbon atoms or 1 to 16 carbon atoms, and for example, may be alkyl having 1 to 24 carbon atoms. The compound represented by Formula 2 may be, for example, alkyl (meth)acrylate. Here, the term "(meth)acrylate" means acrylate or methacrylate. The alkyl (meth)acrylate may be exemplified by, for example, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, hexyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate or lauryl (meth)acrylate, and the like, but is not limited thereto.

In one example, the second block of the block copolymer according to the present application may comprise a unit represented by Formula 3 below.

[Formula 3]

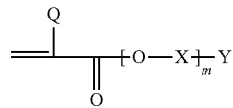

In Formula 3, Q is hydrogen or an alkyl group having 1 to 20 carbon atoms, X is an alkylene group having 1 to 8 carbon atoms, and Y is $-OR_2$ or $-NR_3R_4$, where $R_2$, $R_3$ and $R_4$ are each independently hydrogen, an alkyl group having 1 to 32 carbon atoms, an aromatic hydrocarbon having 6 to 32 carbon atoms or a carboxyl group.

In Formula 3 above, the alkyl group present in Q may be an alkyl group having 1 to 20 carbon atoms, 1 to 16 carbon atoms, 1 to 12 carbon atoms, 1 to 8 carbon atoms or 1 to 4 carbon atoms. The alkyl group may be linear, branched or cyclic. In addition, the alkyl group may be optionally substituted with one or more substituents.

Here, the substituent which may optionally be substituted on the alkyl group or hydrocarbon group, and the like in Formula 3 above may be exemplified by halogen such as chlorine or fluorine, an epoxy group such as a glycidyl group, an epoxyalkyl group, a glycidoxyalkyl group or an alicyclic epoxy group, a acryloyl group, a methacryloyl group, an isocyanate group, a thiol group, an alkyl group, an alkenyl group, an alkynyl group or an aryl group, and the like, but is not limited thereto.

In Formula 3 above, X may be an alkylene group having 1 to 8 carbon atoms, and may be an alkylene group having 1 to 7 carbon atoms, 1 to 6 carbon atoms or 1 to 4 carbon atoms, but is not limited thereto.

In Formula 3 above, $R_2$, $R_3$ and $R_4$ may be each independently hydrogen, may be an alkyl group having 1 to 32 carbon atoms, an alkyl group having 1 to 30 carbon atoms, an alkyl group having 1 to 28 carbon atoms or an alkyl group having 1 to 24 carbon atoms, may be an aromatic hydrocarbon having 6 to 28 carbon atoms or an aromatic hydrocarbon having 6 to 24 carbon atoms, or may be a carboxyl group.

The unit represented by Formula 3 may be included in a range of 1 part by weight to 30 parts by weight relative to 100 parts by weight of the second block of the block copolymer. The unit represented by Formula 3 may be 1.0 part by weight or more, 1.2 parts by weight or more, 1.3 parts by weight or more, 1.4 parts by weight or more, or 1.5 parts by weight or more, relative to 100 parts by weight of the second block of the block copolymer, and may be 30 parts by weight or less, 29 parts by weight or less, 28 parts by weight or less, 27 parts by weight or less, 26 parts by weight or less, or 25 parts by weight or less, but is not limited thereto. When the unit represented by Formula 3 is added in an excess amount, domains may not be formed due to excessively high solubility in the electrolyte, and thus the gel polymer electrolyte film may fail to secure sufficient modulus, and may have poor durability.

In one example, the second block of the block copolymer according to the present application may comprise a monomer having a cross-linkable functional group. An example of the cross-linkable functional group may include a hydroxyl group, a carboxyl group, an epoxy group or an isocyanate group, and the like. Furthermore, the monomer may be (meth)acrylate. The (meth)acrylate monomer having a hydroxyl group may be exemplified by, for example, hydroxymethyl (meth)acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and the like, but is not limited thereto. The monomer comprising an isocyanate group may include, for example, 2-methacryloyloxyethyl isocyanate, 3-methacryloyloxy-n-propyl isocyanate, 2-methacryloyloxyisopropyl isocyanate, 4-methacryloyloxy-n-butyl isocyanate, 2-methacryloyloxy-tert-butyl isocyanate, 2-methacryloyloxybutyl-4-isocyanate, 2-methacryloyloxybutyl-3-isocyanate, 2-methacryloyloxybutyl-2-isocyanate, 2-methacryloyloxybutyl-1-isocyanate, 5-methacryloyloxy-n-pentyl isocyanate, 6-methacryloyloxy-n-hexyl isocyanate, 7-methacryloyloxy-n-heptyl isocyanate, 2-(isocyanatoethyloxy)ethyl methacrylate, 3-methyacryloyloxyphenyl isocyanate, 4-methacryloyloxyphenyl isocyanate, 2-acryloyloxyphenyl isocyanate, 2-acryloyloxyethyl isocyanate, 3-acryloyloxy-n-propyl isocyanate, 2-acryloyloxyisopropyl isocyanate, 4-acryloyloxy-n-buyl isocyanate, 2-acryloyloxy-tert-butyl isocyanate, 2-acryloyloxybutyl-4-isocyanate, 2-acryloyloxybutyl-3-isocyanate, 2-acryloyloxybutyl-2-isocyanate, 2-acryloyloxybutyl-1-isocyanate, 5-acryloyloxy-n-pentyl isocyanate, 6-acryloyloxy-n-hexyl isocyanate, 7-acryloyloxy-n-heptyl isocyanate, 2-(isocyanatoethyloxy)ethyl acrylate, 3-acryloyloxyphenyl isocyanate, 4-acryloyloxyphenyl isocyanate, 1,1-bis(methacryloyloxymethyl)methyl isocyanate, 1,1-bis(methacryloyloxymethyl)ethyl isocyanate, 1,1-bis(acryloyloxymethyl) methyl isocyanate, 1,1-bis(acryloyloxymethyl)ethyl isocyanate, 2'-pentenoyl-4-oxyphenyl isocyanate, and the like, and for example, may be exemplified by 2-methacryloyloxyethyl isocyanate, 4-methacryloyloxy-n-butyl isocyanate, 5-methacryloyloxy-n-pentyl isocyanate, 6-methacryloyloxy-n-hexyl isocyanate, 2-acryloyloxyethyl isocyanate, 3-methacryloyloxyphenyl isocyanate, 4-methacryloyloxyphenyl isocyanate, 1,1-bis(metharyloyloxymethyl)ethyl isocyanate, 2-(isocyanatoethyloxy)ethyl methacrylate or 2-(isocyanatoethyloxy)ethyl acrylate, but is not limited thereto. The monomer having a cross-linkable functional group may be included alone or in combination of two or more.

The monomer having a cross-linkable functional group may be included in a range of 1 part by weight to 60 parts by weight relative to 100 parts by weight of the second block of the block copolymer. The monomer having a cross-linkable functional group may be 1.0 part by weight or more, 1.2 parts by weight or more, 1.3 parts by weight or more, 1.4 parts by weight or more, or 1.5 parts by weight or more, relative to 100 parts by weight of the second block of the block copolymer, and may be 60 parts by weight or less, 59 parts by weight or less, 58 parts by weight or less, 57 parts by weight or less, 56 parts by weight or less, or 55 parts by weight or less, but is not limited thereto. When the monomer having a cross-linkable functional group is contained in an excessive amount, it may not exhibit sufficient ion conductivity.

In one example, the gel polymer electrolyte of the present application may comprise 5 to 95 parts by weight of the block copolymer relative to 100 parts by weight of the total polymer electrolyte. The block copolymer may be 5 parts by weight or more, 6 parts by weight or more, 7 parts by weight or more, 8 parts by weight or more, 9 parts by weight or more, or 10 parts by weight or more, relative to 100 parts by weight of the total polymer electrolyte, and may be 95 parts by weight or less, 94 parts by weight or less, 93 parts by weight or less, 92 parts by weight or less, 91 parts by weight or less, or 90 parts by weight or less, but is not limited thereto.

In one example according to the present application, the block copolymer may comprise 10 to 500 parts by weight or 20 to 450 parts by weight of the second block relative to 100 parts by weight of the first block, but is not limited thereto. The first block of the block copolymer according to the present application is a portion which is dissolved in a polar solvent and becomes a transfer passage for lithium ions, and the second block is a portion which is not completely dissolved in a solvent and forms a hard domain, thereby imparting durability to the gel polymer electrolyte film. Therefore, when the content of the first block and the second block in the block copolymer is out of the above range, the ion conductivity may be lowered or the durability of the gel polymer electrolyte may be lowered.

The block copolymer may have a number average molecular weight (Mn) in a range of 5,000 to 500,000. The number average molecular weight mentioned herein can be measured using GPC (gel permeation chromatograph). In another example, the number average molecular weight of the block copolymer may be 6,000 or more, 7,000 or more, 8,000 or more, or 9,000 or more. In another example, the number average molecular weight may be 490,000 or less, 480,000 or less, or 450,000 or less or so. By controlling the molecular weight characteristics of the block copolymer as above, a polymer electrolyte having excellent physical properties can be provided.

In one example, the block copolymer of the present application may have a molecular weight distribution (PDI) of 1.0 to 1.3. The molecular weight distribution (PDI; Mw/Mn) may mean a ratio (Mw/Mn) of the weight average molecular weight (Mw) to the number average molecular weight (Mn). The molecular weight distribution of the block copolymer may be 1.02 to 1.28, 1.05 to 1.26, and may be, for example, 1.05 to 1.25. The block copolymer of the present application may exhibit high transparency when the molecular weight distribution satisfies the above range, and the turbidity may be increased when the molecular weight distribution is out of the above range.

The method for producing the block copolymer is not particularly limited and can be produced by a typical method. The block polymer can be polymerized by, for example, living radical polymerization, and an example thereof includes anionic polymerization in which the block copolymer is synthesized in the presence of an inorganic acid salt such as an alkali metal or an alkali earth metal by using an organic rare earth metal complex as a polymerization initiator or by using an organic alkali metal compound as a polymerization initiator, an anionic polymerization method in which the block copolymer is synthesized in the presence of an organic aluminum compound by using an organic alkali metal compound as a polymerization initiator, an atom transfer radical polymerization method (ATRP) using an atom transfer radical polymerization agent as a polymerization inhibitor, an ARGET (Activators Regenerated by Electron Transfer) atom transfer radical polymerization method (ATRP), which uses an atom transfer radical polymerization agent as a polymerization initiator, but performs polymerization under an organic or inorganic reducing agent that generates electrons, an ICAR (Initiators for Continuous Activator Regeneration), a polymerization method by reversible addition-fragmentation chain transfer (RAFT) using an inorganic reducing agent and a reversible addition-fragmentation chain transfer agent or a method of using an organotellurium compound as an initiator, and the like, and a suitable method may be selected among these methods and applied.

In one example of the present application, the gel polymer electrolyte may comprise a glycolic oligomer. The glycolic oligomer may comprise a reactive functional group at the end thereof, where the number of functional groups is not particularly limited. The functional group may include an acrylate group or a diacrylate group, and the like, but is not limited thereto.

The glycolic oligomer may comprise one or more oligomers among a polypropylene glycolic oligomer, a polyethylene glycolic oligomer, a polyethylene imine oligomer and an aniline oligomer. The glycolic oligomer can form a gel polymer electrolyte through UV irradiation and can realize a polymer structure in which electrolyte ions can easily move due to a pair of non-covalent electrons of oxygen or nitrogen present in a molecule, where the gel polymer electrolyte comprising the same can exhibit excellent ionic conductivity.

The weight average molecular weight of the glycolic oligomer may be 100 to 50,000, or 500 to 20,000, but is not limited thereto.

The content of the glycolic oligomer may be 10 to 500 parts by weight, 15 to 450 parts or 50 to 300 parts by weight, relative to 100 parts by weight of the block copolymer, but is not limited thereto. When the content of the oligomer is lower than 50, the curing may not be sufficiently performed, and a film shaped electrolyte may not be obtained. When the oligomer content is higher than 500, transparency of the prepared gel polymer electrolyte may be lowered.

The gel polymer electrolyte according to the present application may comprise a lithium salt. The lithium salt may be one or more selected from the group consisting of LiF, LiCl, LiBr, LiI, LiClO$_4$, LiClO$_3$, LiAsF$_6$, LiSbF$_6$, LiAlO$_4$, LiAlCl$_4$, LiNO$_3$, LiN(CN)$_2$, LiPF$_6$, Li(CF$_3$)$_2$PF$_4$, Li(CF$_3$)$_3$PF$_3$, Li(CF$_3$)$_4$PF$_2$, Li(CF$_3$)$_5$PF$_4$, Li(CF$_3$)$_6$P, LiSO$_3$CF$_3$, LiSO$_3$C$_4$F$_9$, LiSO$_3$(CF$_2$)$_7$CF$_3$, LiN(SO$_2$CF$_3$)$_2$, LiN(SO$_2$CaF$_{2a+1}$)(SO$_2$C$_b$F$_{2b+1}$) (provided that a and b are each a natural number), LiOC(CF$_3$)$_2$CF$_2$CF$_3$, LiCO$_2$CF$_3$, LiCO$_2$CH$_3$, LiSCN, LiB(C$_2$O$_4$)$_2$, LiBF$_2$(C$_2$O$_4$) and LiBF$_4$. The a and b may be each a natural number of 1 to 100. The lithium compound may be contained in an amount of 10 to 500 parts by weight, 15 to 470 parts by weight or 30 to 450 parts by weight relative to 100 parts by weight of the block copolymer. When the content of the lithium compound is 10 or less, sufficient ionic conductivity may not be ensured.

The gel polymer electrolyte according to the present application may comprise 10 to 500 parts by weight, 15 to 450 parts by weight or 50 to 300 parts by weight of the glycolic oligomer and may comprise 10 to 500 parts by weight, 15 to 470 parts by weight or 30 to 450 parts by weight of the lithium salt, relative to 100 parts by weight of the block copolymer. By controlling the content of the electrolyte in the above range, it is possible to form a gel polymer electrolyte exhibiting high ionic conductivity, low turbidity and adhesive force.

In another example of the present application, the gel polymer electrolyte may further comprise a polar solvent. The polar solvent is used as a plasticizer of the electrolyte, and has high dielectric constant, so that it can increase the ionic conductivity of the gel polymer electrolyte. The polar solvent may be a solvent showing higher solubility for the first block of the block copolymer, and as long as it may facilitate the movement of lithium ions, various solvents known in the art may be used, and for example, it may be one or more among a carbonate-based compound, an ether-based compound and an ester-based compound.

In one example, the polar solvent may comprise a carbonate-based compound. The carbonate-based compound may be one or more selected from the group consisting of dimethyl carbonate, diethyl carbonate, dipropyl carbonate, methylpropyl carbonate, ethylpropyl carbonate, methylethyl carbonate, ethyl fluoroethyl carbonate, ethylene carbonate, propylene carbonate, fluoroethylene carbonate and butylene carbonate. The content of the carbonate compound may be 100 to 1000 parts by weight or 300 to 800 parts by weight relative to 100 parts by weight of the block copolymer. When the content of the carbonate compound is 100 parts by weight or less, ionic conductivity may be lowered.

In one example, the gel polymer electrolyte according to the present application may comprise a unit derived from polymerizing a multifunctional (meth)acrylate. The multifunctional (meth)acrylate can cross-link the glycolic olygomer and the block copolymer to provide the transfer passage for electrolyte ions. The multifunctional (meth) acrylate may comprise one or more of acrylic acid, isobornyl acrylate, acrylonitrile, ethylene glycol (meth)acrylate, ethylhexyl (meth)acrylate, methyl (meth)acrylate, ethylene glycol di(meth)acrylate, 1,6-hexanediol di(meth)acrylate, tri (propylene glycol) di(m eth)acrylate, tris(2-(meth) acryloethyl)isocyanurate, trimethylolpropane tri(meth) acrylate, pentaerythritol di(meth)acrylate, pentaerythritol tri (meth)acrylate, pentaerythritol tetra(meth)acrylate, dipentaerythritol di(meth)acrylate, dipentaerythritol tri (meth)acrylate, dipentaerythritol tetra(meth)acrylate, dipentaerythritol penta(meth)acrylate, dipentaerythritol hexa(metha) acrylate, and the like, but is not limited thereto.

The content of the multifunctional (meth)acrylate may be 0.01 to 5 parts by weight, and may be 0.05 to 1 part by weight, relative to the total weight of the block copolymer and the glycolic oligomer, but is not limited thereto. If the content of the monomer is 0.01 or less, the curing may not be sufficiently performed, and a film shaped electrolyte may not be obtained.

The gel polymer electrolyte of the present application may also comprise a radical initiator. Also, in one example, the kind of the radical initiator is not particularly limited. For example, an acetophenone-based compound, a biimidazole-based compound, a triazine-based compound, an oxime-based compound, and the like can be used. The acetophenone-based compound usable as the radical initiator is selected from the group consisting of 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl) ketone, 1-hydroxycyclohexyl phenyl ketone, benzoin methyl ether, benzoin ethyl ether, benzoin isobutyl ether, benzoin butyl ether, 2,2-dimethoxy-2-phenyl acetophenone, 2-methyl-(4-methylthio)phenyl-2-morpholino-1-propan-1-one, 2-benzyl-2-dimethylamino-1-(4-morpholinophenyl)-butan-1-one, 2-(4-bromo-benzyl-2-dimethylamino-1-(4-morpholinophenyl)-butan-1-one and 2-methyl-1-[4-(methylthio)phenyl]-2-morpholinopropane-1-one, the biimidazole-based compound is selected from the group consisting of 2,2-bis(2-chlorophenyl)-4,4',5,5'-tetraphenyl biimidazole, 2,2'-bis(o-chlorophenyl)-4,4',5,5'-tetrakis(3,4,5-trimethoxyphenyl)-1,2'-biimidazole, 2,2'-bis(2,3-dichlorophenyl)-4,4',5,5'-tetraphenyl bimidazole and 2,2'-bis(o-chlorophenyl)-4,4,5,5'-tetraphenyl-1,2'-biimidazole, the triazine-based compound is selected from the group consisting of 3-{4-[2,4-bis(trichloromethyl)-s-triazin-6-yl]phenylthio}propionic acid, 1,1,1,3,3,3-hexafluoroisopropyl-3-{4-[2,4-bis(trichloromethyl)-s-triazin-6-yl]phenylthio}propionate, ethyl-2-{4-[2,4-bis(trichloromethyl)-s-triazin-6-yl]phenylthio}acetate, 2-epoxyethyl-2-{4-[2,4-bis(trichloromethyl)-s-triazine-6-yl]phenylthio}acetate, cyclohexyl-2-{4-[2,4-bis(trichloromethyl)-s-triazine-6-yl]phenylthio}acetate, benzyl-2-{4-[2,4-bis(trichloromethyl)-s-triazine-6-yl]phenylthio}acetate, 3-{chloro-4-[2,4-bis(trichloromethyl)-s-triazine-6-yl]phenylthio}propionic acid, 3-{4-[2,4-bis(trichloromethyl)-s-triazine-6-yl]phenylthio}propionamide, 2,4-bis(trichloromethyl)-6-p-methoxystyryl-s-triazin, 2,4-bis(trichloromethyl)-6-(1-p-dimethylaminophenyl)-1,3-butadienyl-s-triazine and 2-trichloromethyl-4-amino-6-p-methoxystyryl-s-triazine, and the oxime-based compound includes 1,2-octadione-1-(4-phenylthio)phenyl-2-(o-benzoyloxime) (Ciba Geigy, CGI 124), and ethanone-1-(9-ethyl)-6-(2-methylbenzoyl-3-yl)-1-(o-acetyloxime) (CGI242), oxime OX-03 (Ciba Geigy), NCI-831 (ADEKA), PI-102 (LG Chem), PBG 304, PBG 305, PBG 3057 (Tronly), and the like.

The content of the radical initiator may be 0.01 to 5 parts by weight, and may be 0.05 to 1 part by weight, relative to the total weight of the block polymer and the oligomer, but is not limited thereto. If the content of the radical initiator is 0.01 or less, the curing may not be sufficiently performed, and a film shaped electrolyte may not be obtained.

In another example, the present application relates to a method for producing a gel polymer electrolyte. The method for producing a gel polymer electrolyte may comprise steps of coating a composition comprising a block copolymer which comprises a first block comprising a unit represented by Formula 1 below; and a second block comprising a unit containing an amino group, a hydroxyl group or polyalkylene oxide and a unit derived from polymerizing a monomer of Formula 2 below, between a plurality of release films; and curing the mixture.

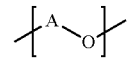

[Formula 1]

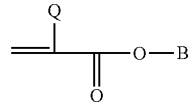

[Formula 2]

In Formula 1, A is an alkylene group having 1 to 8 carbon atoms, and in Formula 2, Q is hydrogen or an alkyl group having 1 to 20 carbon atoms and B is an alkyl group having 1 to 32 carbon atoms, an aromatic hydrocarbon having 6 to 32 carbon atoms or a carboxyl group.

The composition may comprise the block copolymer, the glycolic oligomer and the lithium salt as described above, and may further comprise a polar solvent, a multifunctional (meth)acrylate and a radical initiator.

In one example, the kind of the release film is not particularly limited. For example, a release film formed of a polyester resin such as polyethylene terephthalate, polybutylene terephthalate, polyethylene naphthalate and polybutylene naphthalate; a polyimide resin; an acrylic resin; a styrene resin such as polystyrene and acrylonitrile-styrene; a polycarbonate resin; a polylactic acid resin; a polyurethane resin; a polyolefin resin such as polyethylene, polypropylene and an ethylene-propylene copolymer; a vinyl resin such as polyvinyl chloride and polyvinylidene chloride; a polyamide resin; a sulfonic resin; a polyether-ether ketone resin; an allylate-based resin; or a mixture of these resins, may be used.

In one example, the curing may be performed by being irradiated with light in a wavelength range of 10 nm to 400 nm at a light quantity of 0.5 to 5 J/cm$^2$. As a means for irradiation of light in the wavelength range, a commonly used apparatus can be used, and for example, a Xe lamp, a mercury lamp or a metal halide lamp, and the like can be used.

In another example, the viscosity of the electrolyte composition may be 10 to 100,000 cps, and may be 1,000 to 50,000 cps, based on 25° C. If the viscosity of the electrolyte solution is less than 10 cps, the coating processability may be lowered. If the viscosity exceeds 100,000 cps, the film shaped coating may be difficult due to mixing and defoaming process defects.

The present application also relates to an electrochromic device. An exemplary electrochromic device of the present application is presented in FIG. 1, which is an electrochromic device comprising a first substrate 10; a first transparent electrode 11; an electrochromic layer 12; a gel polymer electrolyte layer 20; a second substrate 30; a second transparent electrode 31; and an ion storage layer 32, where the gel polymer electrolyte layer may include a gel polymer electrolyte that includes the above-described block copolymer. The properties of the gel polymer electrolyte are as described above.

In the present application, the thickness of the gel polymer electrolyte layer may be 10 to 1,000 μm, and may be 50 to 100 μm, but is not limited thereto. If the thickness of the gel polymer electrolyte layer is less than 10 μm, the process may be difficult to be performed in cutting characteristic and lamination processes, and if the thickness is more than 1,000 μm, it takes a long time for Li ions to move to the electrochromic device, whereby the reaction rate may be lowered.

In one example, the modulus of the gel polyelectrolyte layer may be $10^4$ to $10^7$ Pa and may be $10^5$ to $10^7$ Pa. If the modulus of the gel polymer electrolyte layer is less than $10^5$ Pa, the adhesion reliability is poor, and if it is more than $10^7$ Pa, the ionic conductivity may drop and the adhesion reliability may be deteriorated.

The first electrode and the second electrode may mean a structure capable of supplying electric charges to the electrochromic layer. In one example, the transparent electrode may be formed by comprising one or more of a transparent conductive oxide, a conductive polymer, an Ag nanowire or a metal mesh. More specifically, it may comprise one or more materials selected from the group consisting of ITO (indium tin oxide), FTO (fluor doped tin oxide), AZO (aluminum doped zinc oxide), GZO (gallium doped zinc oxide), ATO (antimony doped tin oxide), IZO (indium doped zinc oxide), NTO (niobium doped titanium oxide), ZnO, OMO (oxide/metal/oxide) and CTO (cadmium tin oxide).

The method of forming the transparent electrode is not particularly limited and known methods can be used without limitation. For example, a transparent electrode may be provided by forming an electrode material containing transparent conductive oxide particles in a thin film form on a transparent glass substrate through a sputtering process. The transparent electrode may have a thickness of 150 nm or more, 200 nm or more, or 300 nm or more in the range of 1 nm to 1 μm. The upper limit of the transparent electrode thickness is not particularly limited, but the transparent electrode may have a thickness of 800 nm or less, 700 nm or less, or 500 nm or less for low resistance implementation. In addition, the transparent electrode may have a transmittance in a range of 70% to 90% for visible light in order to sufficiently reflect a change in light transmittance of the electrochromic device.

In the present application, the electrochromic layer and the ion storage layer may comprise an electrochromic material to undergo a redox reaction, where the electrochromic material may exhibit switching of coloring and bleaching by the redox reaction. As the usable electrochromic material, a conductive polymer, an organic electrochoromic material and/or an inorganic electrochoromic material can be exemplified. As the conductive polymer, polypyrrole, polyaniline, polypyridine, polyindole, polycarbazole, and the like can be used, and as the organic electrochoromic material, a material such as viologen, anthraquinone and phenothiazine can be used, without being limited thereto.

Also, the inorganic electrochoromic material may comprise one or more metal oxides among oxides of Ti, Nb, Mo, Ta, W, V, Cr, Mn, Co, Ni, Rh and Ir. The electrochromic layer and the ion storage layer may comprise inorganic electrochoromic materials that are complementary to each other in the redox reaction. For example, when the electrochromic layer comprises a reducing inorganic electrochoromic material which is an oxide of Ti, Nb, Mo, Ta and W, specifically, one or more reducing inorganic electrochoromic materials among $TiO_2$, $Nb_2O_5$, $MoO_3$, $Ta_2O_5$ and $WO_3$, the ion storage layer may comprise an oxidizing inorganic electrochoromic material which is an oxide of V, Cr, Mo, Co, Ni, Rh and IR, specifically, one or more oxidizing inorganic electrochoromic materials among $V_2O_5$, $CrO_3$, $LixCoO_2$, $LiNiO$, (provided that x is 1 to 3), $Rh_2O_3$ and $IrO_2$.

In the present application, the term "reducing inorganic electrochoromic material" means a material that is colored by a reduction reaction, and the term "oxidizing inorganic electrochoromic material" means a material that is colored by an oxidation reaction.

In another example, the electrochromic layer may have a transmittance of 10% to 30% for visible light upon coloring and may have a transmittance of 55% to 75% for visible light upon bleaching. Furthermore, the electrochromic layer may have a thickness of 350 nm or less, 250 nm or less, 150 nm or less, or 120 nm or less in the range of 50 nm to 400 nm. If the thickness is less than 50 nm, the reaction for color-switching is difficult to occur sufficiently, and if it exceeds 150 nm, a thin film electrochromic device cannot be provided and the transmittance of the device can be reduced.

The ion storage layer may have a transmittance of 5% to 40% for visible light upon coloring, and may have a transmittance of 45% to 80% for visible light upon bleaching. Also, the electrochromic layer may have a thickness of 350 nm or less, 250 nm or less, 150 nm or less, or 120 nm or less in the range of 10 nm to 400 nm. If the thickness is less than 10 nm, the reaction for color-switching is difficult to occur sufficiently, and if it exceeds 150 nm, a thin film electrochromic device cannot be provided and the transmittance of the device may be reduced.

Advantageous Effects

According to the present application, the gel polymer electrolyte comprising the block copolymer has low turbidity and high ionic conductivity. In addition, since the gel polymer electrolyte has excellent adhesiveness of the electrolyte layer to the electrode structure of the electrochromic device, it can contribute to improving the durability and cycle characteristics of the electrochromic device.

BRIEF DESCRIPTION OF DRAWINGS

FIG. 1 is a schematic diagram of a structure of an electrochromic device comprising a gel polymer electrolyte according to the present application.

FIG. 2 is a color-switching driving image of the electrochromic device according to Examples and Comparative Examples.

MODE FOR INVENTION

Hereinafter, the present application will be described in detail by way of examples, but the scope of the present application is not limited by the following examples.

Preparation Example 1. Preparation of Block Copolymer (GP1)

To prepare an initiator for atom transfer radical polymerization (ATRP), 3 equivalents of triethylamine (TEA) and 2 equivalents of 2-bromoisobutyryl bromide are added relative to 1 equivalent of the terminal hydroxy (mPEG-OH) of polyethylene glycol and reacted. In order to remove impurities, the reaction product was dissolved in a diethyl ether solvent to recover a precipitate, which was repeated twice and then dried.

The prepared initiator has bromine at the end of the polyethylene glycol (PEG) polymer, where 49 parts by weight of the prepared initiator is dissolved in ethanol as a reaction solvent and 43 parts by weight of methyl methacrylate, 2.25 parts by weight of polyethylene glycol-acrylate and 4.75 parts by weight of hydroxypropyl methacrylate are introduced thereto. The flask is sealed with a rubber membrane, and the dissolved oxygen is removed through nitrogen bubbling for 30 minutes while stirring at room temperature. Thereafter, the flask was immersed in an oil bath at 60° C., and a catalyst solution and a catalyst reducing agent were added thereto, and the reaction was carried out for 24 hours. As the ATRP catalyst, 100 ppm of copper bromide ($CuBr_2$) and 2 equivalents of tris(2-pyridylmethyl)amine (TPMA) relative to copper were dissolved in acetonitrile (CAN) and used. As the catalyst reducing agent, 6 equivalents (relative to Cu) of 2,2'-azobis(2.4-dimethylvaleronitrile) (V-65) was used.

The prepared block polymer is dissolved in ethyl acetate. This was immersed in an oil bath set at 60° C. under an oxygen pressure, and then 1 equivalent of 2-isocyanatoethyl acrylate (AOI) and 0.1 equivalents of dibutyltin dilaurate (DBTDL) relative to the hydroxy functional group of the hydroxypropyl methacrylate were added thereto and stirred for 4 hours, where the hydroxy functional group and the isocyanate group of 2-isocyanatoethyl acrylate were subjected to urethane reaction to introduce the acryloyl group. After completing the reaction, the reactant is precipitated in a cold mixed solution of isopropyl alcohol:hexane=1:1 and purified. The block weight ratio (first block:second block) of the prepared block copolymer (GP1) was confirmed to be 50:50.

Preparation Example 2. Preparation of Block Copolymer (GP2)

An initiator was prepared in the same manner as in Preparation Example 1. A block copolymer was prepared in the same manner as in Preparation Example 1, except that 64 parts by weight of the prepared initiator was dissolved in ethanol and 29.75 parts by weight of methyl methacrylate, 1.75 parts by weight of polyethylene glycol-acrylate and 3.5 parts by weight of hydroxypropyl methacrylate were added. The block weight ratio (first block:second block) of the prepared block copolymer (GP2) was confirmed to be 65:35.

Preparation Example 3. Preparation of Block Copolymer (GP3)

An initiator was prepared in the same manner as in Preparation Example 1. A block copolymer was prepared in the same manner as in Preparation Example 1, except that 79 parts by weight of the prepared initiator was dissolved in ethanol and 17 parts by weight of methyl methacrylate, 1 part by weight of polyethylene glycol-acrylate and 2 parts by weight of hydroxypropyl methacrylate were added. The block weight ratio (first block:second block) of the prepared block copolymer (GP3) was confirmed to be 80:20.

Preparation Example 4. Preparation of Block Copolymer (GP4)

An initiator was prepared in the same manner as in Preparation Example 1. A block copolymer was prepared in the same manner as in Preparation Example 1, except that 49 parts by weight of the prepared initiator was dissolved in ethanol and 43.5 parts by weight of methyl methacrylate, 2.5 parts by weight of N,N-dimethylaminoethyl methacrylate and 4 parts by weight of hydroxypropyl methacrylate were added. The block weight ratio (first block:second block) of the prepared block copolymer (GP4) was confirmed to be 50:50.

Preparation Example 5. Preparation of Block Copolymer (GP5)

An initiator was prepared in the same manner as in Preparation Example 1, and a block copolymer was prepared in the same manner as in Preparation Example 1, except that 49 parts by weight of the prepared initiator was dissolved in ethanol and 46 parts by weight of methyl methacrylate and 4 parts by weight of hydroxypropyl methacrylate were added. The block weight ratio (first block:second block) of the prepared block copolymer (GP5) was confirmed to be 50:50.

Preparation Example 6. Preparation of Random Copolymer (GP6)

2 parts by weight of polyethylene glycol-acrylate purchased from a reagent manufacturer (Sigma Aldrich), 43.5 parts by weight of methyl methacrylate and 4.5 parts by weight of hydroxypropyl methacrylate are introduced thereto. The flask is sealed with a rubber membrane, and the dissolved oxygen is removed through nitrogen bubbling for 30 minutes while stirring at room temperature. Thereafter, the flask was immersed in an oil bath at 60° C., and a catalyst solution and a catalyst reducing agent were added thereto, and the reaction was carried out for 24 hours. As the ATRP catalyst, 100 ppm of copper bromide ($CuBr_2$) and 2 equivalents of tris(2-pyridylmethyl)amine (TPMA) relative to copper were dissolved in acetonitrile (CAN) and used. As the catalyst reducing agent, 6 equivalents (relative to Cu) of 2,2'-azobis(2.4-dimethylvaleronitrile) (V-65) was used.

The prepared random polymer is dissolved in ethyl acetate. This is immersed in an oil bath set at 60° C. under an oxygen pressure, and then 1 equivalent of 2-isocyanatoethyl acrylate (AOI) and 0.1 equivalents of dibutyltin dilaurate (DBTDL) relative to the hydroxy functional group of the hydroxypropyl methacrylate were added thereto and stirred for 7 hours. After completing the reaction, the reactant is precipitated in a cold mixed solution of isopropyl alcohol:hexane=1:1 and purified.

Example 1

Preparation of Coating Liquid

A mixed liquid of 1.0 g of the block copolymer (GP1) prepared in Preparation Example 1, 1.0 g of polypropylene glycol, 4 g of $LiClO_4$ dissolved in propylene carbonate, 0.2 g of pentaerythritol triacrylate and 0.3 g of a radical initiator (Irgacure 819, a product from Ciba) is mixed with the homogenizer at 600 rpm for 3 hours or more to blend well.

Then, to remove bubbles generated in the solution, the lid of the container is slightly opened and left for 3 hours. All processes proceed in a yellow room state where UV is blocked.

Preparation of Polymer Electrolyte

A predetermined amount of the coating liquid is applied between release films, and the film is covered. Then, a Bakers applicator is used to make a uniform thickness. If it is placed in a UV curing unit and cured for 1 minute, a polymer electrolyte in a freestanding film state can be obtained. The transmittance, turbidity, ionic conductivity and the like of the formed polymer electrolyte were measured.

Manufacture of Electrochromic Device

An electrochromic layer such as $WO_3$ and PB was prepared on an ITO film, and then the polymer electrolyte film cured to a uniform thickness on the release film was laminated on the electrochromic layer, where the electrochromic layer was bonded in a sandwich form on both sides. The performance of the device according to the applied voltage was measured.

Examples 2 to 5 and Comparative Examples 1 to 3

A gel polymer electrolyte was prepared in the same manner as in Example 1, except that components and ratios were adjusted as shown in Table 1 upon preparing the coating liquid.

NMR) analysis equipment. As a result of the analysis, 1H peak derived from $CH_2=C(CH_3)$— of the acrylate monomer double bond end was not confirmed, whereby it was confirmed that the unreacted monomer was not present. Also, the 3H peak derived from —$OCH_3$ of the ethylene glycol block end was confirmed at around 3.2 ppm, and on the basis of this, the ratio and the molecular weight of each polymer block were calculated. Since peaks of about 450 H derived from —$CH_2CH_2O$— of ethylene glycol formed into the polymer (4H×113 repeating units) appeared in the region of 3.6 to 3.8 ppm and 3H peaks derived from —$CH_3$ adjacent to the main chain of methyl methacrylate formed into the polymer appeared in the region of 3.5 to 3.6 ppm, the content of each constituent monomer was calculated as a mass fraction by calculating their area ratios. Since 2H peaks derived from —$OCH_2$— adjacent to COO— of dimethylaminoethyl methacrylate and 2-isocyanate methyl acrylate formed into the copolymer appeared in the regions of 4.0 to 4.2 ppm and 3.9 to 4.0 ppm, respectively, the content of each constituent monomer was calculated as a mass fraction through their area ratios.

TABLE 1

|  | Lithium salt (LiClO$_4$) | Copolymer Kind | Copolymer Used amount | Glycolic polymer (PPG) | Multifunctional (meth)acrylate (PETA) | Radical initiator (Irgacure 819) |
| --- | --- | --- | --- | --- | --- | --- |
| Example 1 | 4 | GP1 | 1.0 | 1.0 | 0.2 | 0.3 |
| Example 2 | 4 | GP2 | 1.0 | 1.0 | 0.2 | 0.3 |
| Example 3 | 4 | GP3 | 1.0 | 1.0 | 0.2 | 0.3 |
| Example 4 | 4 | GP4 | 1.0 | 1.0 | 0.2 | 0.3 |
| Example 5 | 4 | GP4 | 0.5 | 1.5 | 0.2 | 0.3 |
| Comparative Example 1 | 4 | GP5 | 1.0 | 1.0 | 0.2 | 0.3 |
| Comparative Example 2 | 4 | GP6 | 1.0 | 1.0 | 0.2 | 0.3 |
| Comparative Example 3 | 4 | — | 0 | 0 | 2.2 | 0.3 |

LiClO$_4$: 1M concentration in propylene carbonate (PC)
Ratios of the polymer and PPG are changed in a state fixed with a weight ratio of lithium salt:copolymer/glycolic oligomer:cross-linkable monomer:radical initiator = 4:2:0.2:0.3
PPG: polypropylene glycol
PETA: pentaerythritol triacrylate
Unit: part by weight Experimental Example 1. Evaluation of Block Ratio and Molecular Weight of the Prepared Copolymer The block ratios and molecular weights of the prepared copolymers were evaluated by the following methods and shown in Table 2 below.

Specifically, the polymer solution from which the catalyst was completely removed was solidified through a purification step, and then the block ratio of the block polymer was confirmed through $^1$H NMR analysis. The purification of the polymer solution was carried out by passing the polymer solution through an alumina column to remove the copper complex catalyst and then dropping it to an excess amount of diethyl ether under stirring to remove the residual monomer, thereby solidifying the polymer. The solidified polymer was dried in a vacuum oven for 24 hours. The block polymer purified by the above method was dissolved in a CDCl$_3$ solvent and measured by nuclear magnetic resonance ($^1$H

TABLE 2

| | Molecular weight (Mw) | Dispersion degree | Block weight ratio (first block/second block) | Second block polymerized unit weight ratio (PMMA/X/AOI) |
| --- | --- | --- | --- | --- |
| GP1[a] | 17,000 | 1.16 | 50/50 | 86/4.5/9.5 |
| GP2[a] | 12,000 | 1.18 | 65/35 | 85/5/10 |
| GP3[a] | 12,000 | 1.10 | 80/20 | 85/5/10 |
| GP4[b] | 26,000 | 1.20 | 50/50 | 87/5/8 |
| GP5[a] | 16,000 | 1.18 | 50/50 | 92/0/8 |
| GP6[a] | 25,000 | 1.43 | | 87/4/9 |

[a]X: polyethylene glycol-acrylate (PEG-acrylate)
[b]X: N,N-dimethylaminoethyl methacrylate (DMAEMA)

Experimental Example 2. Evaluation of Physical Properties of Gel Polymer Electrolyte Film The gel polymer electrolyte compositions of Examples 1 to 5 and Comparative Examples 1 to 3 were each applied to a release film to a constant thickness and then UV cured to prepare a gel polymer electrolyte film. The physical properties of the prepared polymer electrolyte film were evaluated and shown in Table 3.

The transmittance of the gel polymer electrolyte film was measured based on a 550 nm wavelength of the UV-VIS spectrum and the turbidity was measured using a haze meter, where it means that the smaller the value is, the more the transparency is.

The ionic conductivity was obtained by measuring impedance and then using Equation 1 below. A gel polymer electrolyte film sample having constant width and thickness was prepared for measurement. A stainless steel (SUS) substrate having excellent electronic conductivity as an ion blocking electrode was brought into contact with both sides of the plate-shaped sample, and then an alternating voltage was applied through both side electrodes of the sample. At this time, the applied condition was set as amplitude, and the measurement frequency was set in the range of 0.1 Hz to 10 MHz. The bulk resistance of the electrolyte was obtained from an intersection point ($R_b$) where the semicircle or line of the measured impedance trajectory meets the real axis, and the ionic conductivity was obtained from the width and thickness of the sample.

$$\sigma(\Omega \cdot Cm)^{-1} = \frac{1}{R_b} \cdot \frac{t}{A} \quad [\text{Equation 1}]$$

σ: ionic conductivity
$R_b$: intersection point where the impedance trajectory meets the real axis
A: width of sample
t: thickness of the sample

TABLE 3

| | Transmittance (%) | Turbidity (%) | Ionic conductivity (S/cm) | Modulus (Pa) | Adhesion reliability |
|---|---|---|---|---|---|
| Example 1 | 94.6 | 0.7 | $1.7 \times 10^{-3}$ | 198,000 | ○ |
| Example 2 | 94.5 | 0.6 | $1.9 \times 10^{-3}$ | 112,000 | ○ |
| Example 3 | 94.6 | 0.6 | $2.0 \times 10^{-3}$ | 103,000 | ○ |
| Example 4 | 94.7 | 0.6 | $1.6 \times 10^{-3}$ | 210,000 | ○ |
| Example 5 | 94.3 | 1.0 | $1.0 \times 10^{-3}$ | 167,000 | ○ |
| Comparative Example 1 | | | no film formation | | |
| Comparative Example 2 | 93.7 | 1.1 | $1.5 \times 10^{-3}$ | 283,000 | ○ |
| Comparative Example 3 | 89.5 | 1.5 | $4.0 \times 10^{-3}$ | 179,000 | X |

The modulus was measured by using a universal testing machine (UTM, Zwick Roel, Z005), where the sample specimen of the gel polymer electrolyte film (1×12 cm) was fixed with the upper and lower clamps at room temperature and Young's modulus was measured under the conditions of 5% strain and 1 Hz frequency.

With regard to the adhesion reliability, the polymer electrolyte film was laminated on a $WO_3$ substrate, and then when a force of 30N was applied thereto after 30 minutes, the adhesion performance was evaluated by X in the case of being detached and by O in the case of not being detached.

10: substrate
11: transparent electrode
12: electrochromic layer
20: gel polymer electrolyte layer
30: substrate
31: transparent electrode
32: ion storage layer

The invention claimed is:

1. A gel polymer electrolyte comprising (i) a block copolymer which comprises a first block comprising a unit of Formula 1 below; and a second block comprising a unit containing an amino group, a hydroxy group or polyalkylene oxide and a unit derived from polymerizing a monomer of Formula 2 below:

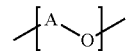
[Formula 1]

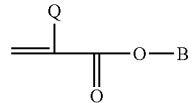
[Formula 2]

wherein, A in Formula 1 is an alkylene group having 1 to 8 carbon atoms, and in Formula 2, Q is hydrogen or an alkyl group having 1 to 20 carbon atoms and B is an alkyl group having 1 to 32 carbon atoms, an aromatic hydrocarbon having 6 to 32 carbon atoms or a carboxyl group, and (ii) a glycolic oligomer, wherein the glycolic oligomer comprises one or more of a polypropylene glycolic oligomer, a polyethylene glycolic oligomer, a polyethylene imine oligomer and an aniline oligomer.

2. The gel polymer electrolyte according to claim 1, wherein B in Formula 2 is an alkyl group having 1 to 32 carbon atoms.

3. The gel polymer electrolyte according to claim 1, wherein the second block comprises a unit represented by Formula 3 below:

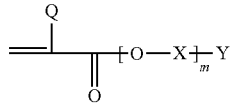
[Formula 3]

wherein, Q is hydrogen or an alkyl group having 1 to 20 carbon atoms, X is an alkylene group having 1 to 8 carbon atoms, Y is $-OR_2$ or $-NR_3R_4$, where $R_2$, $R_3$ and $R_4$ are each independently hydrogen, an alkyl group having 1 to 32 carbon atoms, an aromatic hydrocarbon having 6 to 32 carbon atoms or a carboxyl group, and m is an integer of 1 to 20.

4. The gel polymer electrolyte according to claim 1, wherein the second block further comprises a unit derived from polymerizing a monomer having a cross-linkable functional group.

5. The gel polymer electrolyte according to claim 1, wherein the block copolymer comprises 10 to 500 parts by weight of the second block relative to 100 parts by weight of the first block.

6. The gel polymer electrolyte according to claim 1, further comprising one or more lithium salts selected from the group consisting of LiF, LiCl, LiBr, LiI, LiClO$_4$, LiClO$_3$, LiAsF$_6$, LiSbF$_6$, LiAlO$_4$, LiAlCl$_4$, LiNO$_3$, LiN(CN)$_2$, LiPF$_6$, Li(CF$_3$)$_2$PF$_4$, Li(CF$_3$)$_3$PF$_3$, Li(CF$_3$)$_4$PF$_2$, Li(CF$_3$)$_5$PF, Li(CF$_3$)$_6$P, LiSO$_3$CF$_3$, LiSO$_3$C$_4$F$_9$, LiSO$_3$(CF$_2$)$_7$CF$_3$, LiN(SO$_2$CF$_3$)$_2$, LiN(SO$_2$CaF$_{2a+1}$)(SO$_2$C$_b$F$_{2b+1}$) (provided that a and b are each a natural number), LiOC(CF$_3$)$_2$CF$_2$CF$_3$, LiCO$_2$CF$_3$, LiCO$_2$CH$_3$, LiSCN, LiB(C$_2$O$_4$)$_2$, LiBF$_2$(C$_2$O$_4$) and LiBF$_4$.

7. The gel polymer electrolyte according to claim 1, further comprising a polar solvent.

8. The gel polymer electrolyte according to claim 7, wherein the polar solvent comprises one or more of a carbonate-based compound, an ether-based compound and an ester-based compound.

9. The gel polymer electrolyte according to claim 1, further comprising a unit derived from polymerizing a multifunctional (meth)acrylate.

10. An electrochromic device comprising a first electrode; an electrochromic layer; the gel polymer electrolyte of claim 1; an ion storage layer; and a second electrode.

11. A method for producing a gel polymer electrolyte comprising coating a composition between a plurality of release films, the composition comprising
(i) a block copolymer which comprises a first block comprising a unit of Formula 1 below; and a second block comprising a unit containing an amino group, a hydroxyl group or polyalkylene oxide and a unit derived from polymerizing a monomer of Formula 2 below:

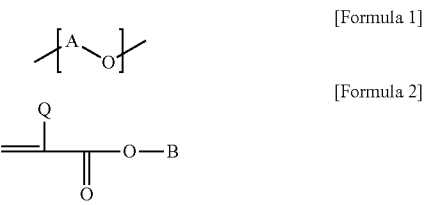

[Formula 1]

[Formula 2]

wherein, A in Formula 1 is an alkylene group having 1 to 8 carbon atoms, and in Formula 2, Q is hydrogen or an alkyl group having 1 to 20 carbon atoms and B is an alkyl group having 1 to 32 carbon atoms, an aromatic hydrocarbon having 6 to 32 carbon atoms or a carboxyl group, and
(ii) a glycolic oligomer, wherein the glycolic oligomer comprises one or more of a polypropylene glycolic oligomer, a polyethylene glycolic oligomer, a polyethylene imine oligomer and an aniline oligomer; and
curing the composition.

* * * * *